US009961660B2

(12) United States Patent
Harris et al.

(10) Patent No.: US 9,961,660 B2
(45) Date of Patent: May 1, 2018

(54) REACTIVATING CELLS TO IMPROVE POSITIONING ACCURACY

(75) Inventors: John Harris, Glenview, IL (US);
Michael Bach, Kildeer, IL (US);
Manivannan Thyagarajan, Coppell, TX (US)

(73) Assignee: Nokia Solutions and Networks Oy, Espoo (FI)

(*) Notice: Subject to any disclaimer, the term of this patent is extended or adjusted under 35 U.S.C. 154(b) by 446 days.

(21) Appl. No.: 14/419,950

(22) PCT Filed: Aug. 8, 2012

(86) PCT No.: PCT/IB2012/054044
§ 371 (c)(1),
(2), (4) Date: Apr. 8, 2015

(87) PCT Pub. No.: WO2014/023999
PCT Pub. Date: Feb. 13, 2014

(65) Prior Publication Data
US 2015/0223185 A1 Aug. 6, 2015

(51) Int. Cl.
*H04W 64/00* (2009.01)
*H04W 48/20* (2009.01)
(Continued)

(52) U.S. Cl.
CPC ........... *H04W 64/00* (2013.01); *G01S 5/0236* (2013.01); *H04W 48/20* (2013.01);
(Continued)

(58) Field of Classification Search
None
See application file for complete search history.

(56) References Cited

U.S. PATENT DOCUMENTS

| 8,374,633 B2* | 2/2013 | Frank | G01S 5/0215 |
| | | | 455/414.1 |
| 9,031,530 B2* | 5/2015 | Awoniyi | H04W 36/22 |
| | | | 455/404.1 |

(Continued)

FOREIGN PATENT DOCUMENTS

| EP | 1 133 845 | 9/1999 |
| WO | WO 2012/075278 A1 | 6/2012 |

OTHER PUBLICATIONS

3GPP TS 32.522 V11.2.0 (Jun. 2012), "3$^{rd}$ Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 35 pgs.

(Continued)

Primary Examiner — Kimberly A Williams
(74) Attorney, Agent, or Firm — Harrington & Smith (57) ABSTRACT

A network access node (eNodeB for example) changing status from active to deactivated sends a message to a location server indicating the changed status. The location server collects from uplink messages indications of which of a plurality of cells have a deactivated status and stores this information in its local memory. Then the location server utilizes the stored indications to ensure that all cells in a list provided to a user equipment for location assistance will have an active status. In various embodiments: the message is sent only when the status is changed for energy saving purposes; a list of cells included in a location request message may have some deactivated cells so the location server sends a message to the eNodeB to activate deactivated cells in the list which is done prior to providing the list (Continued)

to a user equipment; and a partial-activation for a probing/beacon mode is disclosed.

20 Claims, 6 Drawing Sheets

(51) Int. Cl.
G01S 5/02 (2010.01)
H04W 52/02 (2009.01)
H04W 88/08 (2009.01)

(52) U.S. Cl.
CPC ........ *H04W 52/0206* (2013.01); *H04W 88/08* (2013.01); *Y02B 60/50* (2013.01)

(56) References Cited

U.S. PATENT DOCUMENTS

| | | | | |
|---|---|---|---|---|
| 9,516,571 | B2* | 12/2016 | Mohan | H04W 24/02 |
| 2011/0039576 | A1* | 2/2011 | Prakash | G01S 5/0236 |
| | | | | 455/456.1 |
| 2011/0044284 | A1* | 2/2011 | Voltolina | H04W 24/02 |
| | | | | 370/331 |
| 2011/0095946 | A1 | 4/2011 | Castillo | 342/458 |
| 2011/0159893 | A1* | 6/2011 | Siomina | H04W 4/02 |
| | | | | 455/456.3 |
| 2011/0170466 | A1* | 7/2011 | Kwun | H04W 52/0235 |
| | | | | 370/311 |
| 2011/0269427 | A1* | 11/2011 | Kurokawa | H04L 63/162 |
| | | | | 455/411 |
| 2012/0040687 | A1* | 2/2012 | Siomina | G01S 5/0205 |
| | | | | 455/456.1 |
| 2012/0142328 | A1* | 6/2012 | Awoniyi | H04W 36/22 |
| | | | | 455/418 |
| 2012/0149393 | A1 | 6/2012 | Zhang | 455/456.1 |
| 2012/0178473 | A1 | 7/2012 | Wiren et al. | 455/456.2 |
| 2012/0258733 | A1* | 10/2012 | Fischer | H04W 4/20 |
| | | | | 455/456.1 |
| 2012/0327797 | A1* | 12/2012 | Siomina | H04W 36/30 |
| | | | | 370/252 |
| 2014/0011512 | A1* | 1/2014 | Hu | H04L 12/1407 |
| | | | | 455/452.2 |
| 2014/0141792 | A1* | 5/2014 | Larsson | H04W 64/00 |
| | | | | 455/452.1 |
| 2014/0302855 | A1* | 10/2014 | Nory | H04W 48/10 |
| | | | | 455/437 |
| 2015/0118968 | A1* | 4/2015 | Nory | H04W 36/0083 |
| | | | | 455/67.11 |
| 2015/0358899 | A1* | 12/2015 | Ko | H04W 48/16 |
| | | | | 370/252 |
| 2015/0358923 | A1* | 12/2015 | Teng | H04W 52/28 |
| | | | | 455/522 |
| 2015/0373629 | A1* | 12/2015 | Zeng | H04W 24/08 |
| | | | | 370/328 |
| 2016/0309398 | A1* | 10/2016 | Xue | H04W 52/0206 |

OTHER PUBLICATIONS

3GPP TS 32.762 V11.2.0 (Jun. 2012), "3$^{rd}$ Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 55 pgs.

3GPP TS 36.305 V11.0.0 (Jun. 2012), "3$^{rd}$ Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)", 58 pgs.

3GPP TS 36.355 V10.5.0 (Jun. 2012), "3$^{rd}$ Generation Partnership Project; Technical Specification Group Radio Access Network; Evolved Universal Terrestrial Radio Access (E-UTRA); LTE Positioning Protocol (LPP) (Release 10)", 116 pgs.

3GPP TS 36.423 V11.0.0 (Mar. 2012), "3$^{rd}$ Generation Partnership Project; Technical Specification Group Radio Access Network; Evolved Universal Terrestrial Radio Access Network (E-UTRAN); X2 application protocol (X2AP) (Release 11)", 135 pgs.

3GPP TS 36.455 V10.3.0 (Jun. 2012), "3$^{rd}$ Generation Partnership Project; Technical Specification Group Radio Access Network; Evolved Universal Terrestrial Radio Access (E-UTRA)' LTE Positioning Protocol A (LPPa) (Release 10)", 52 pgs.

\* cited by examiner

REACTIVATING CELLS TO IMPROVE POSITIONING ACCURACY

TECHNICAL FIELD

The exemplary and non-limiting embodiments of this invention relate generally to communication systems, methods, devices and computer programs and, more specifically, relate to operations of a communications network in support of providing location assistance to a user equipment (UE). In that regard these teaching relate to both the radio access network (RAN) and the core network (CN) of such a communications network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Increasingly the geographic position of mobile terminals is being used for various purposes. Many of these are for only user-related matters such as geo-tagging a photo or obtaining turn-by-turn navigation directions, but also the communications network has a need for UE position information which may require the UE to send its position information in an uplink location report. Regardless of the purpose, sometimes the UE does not have global positioning system (UPS) capability in which case the network can give assistance to the UE so the UE may more accurately determine its own position terrestrially. For example, the evolved Universal Terrestrial Radio Access Network (E-UTRAN, sometimes referred to as Long Term Evolution LTE) system provides that the UE can rely on transmissions or other information sent by the E-UTRAN eNodeB (eNB) to improve the accuracy of its terrestrial location. See for example 3GPP TS 36.305 v11.0.0 (2012-06); 36.355 v10.5.0 (2012-06) and 36.455 v10.3.0 (2012-06). These procedures also provide for the UE to listen to and measure neighbor cells for this terrestrial positioning, apart from its own serving cell.

Figure 1A:
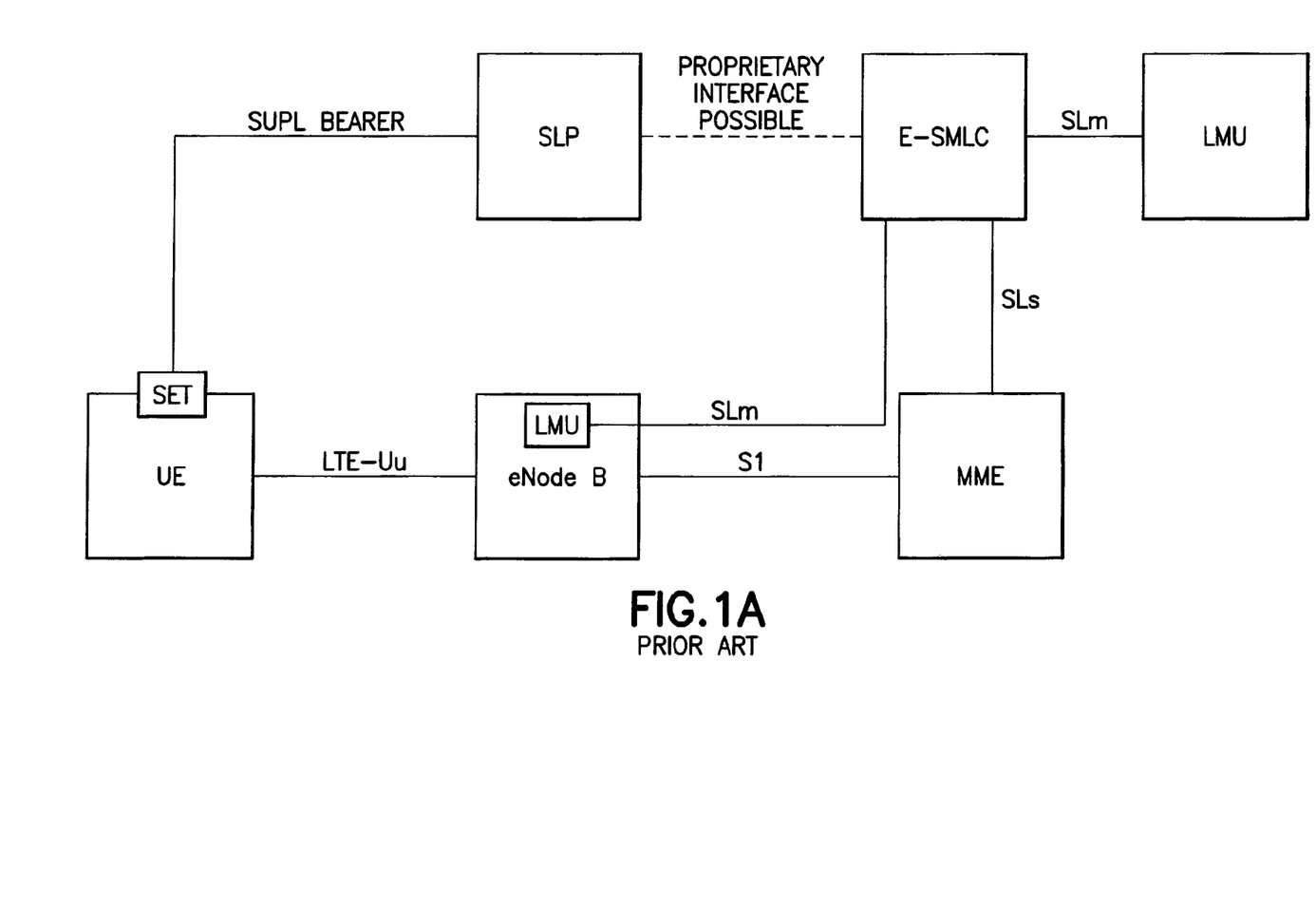
FIG. 1A is a prior art schematic block diagram showing E-UTRAN architecture for UE positioning, including a location server/Enhanced Serving Mobile Location Centre (E-SMLC), reproduced from FIG. 5-1 of 3GPP TS 36.305 v11.0.0.
Figure 1B:
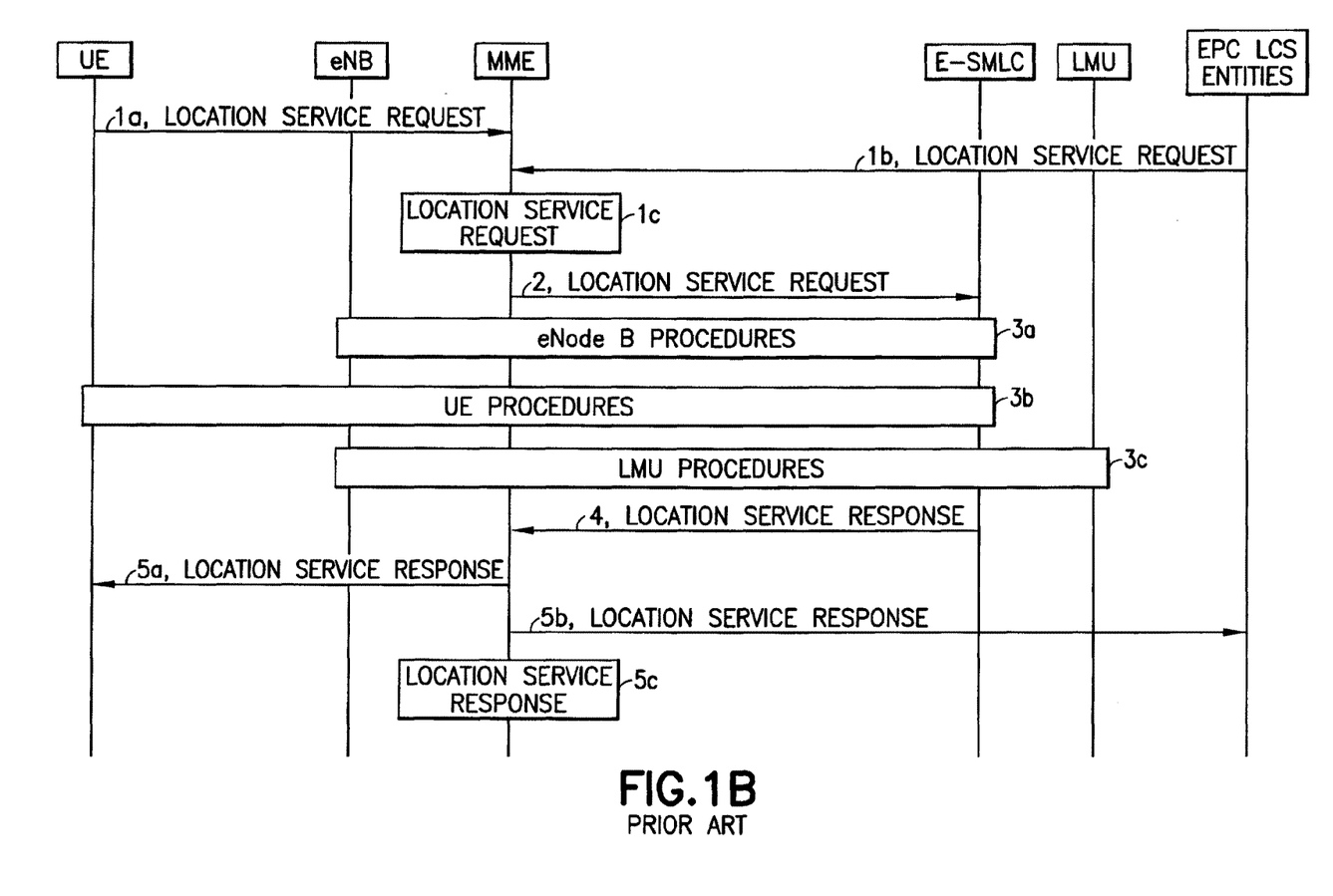
FIG. 1B is a prior art signaling and procedures diagram for UE positioning operations by some of the entities illustrated at FIG. 1A, reproduced from FIGS. 5.1-1 of 3GPP TS 36.305 v11.0.0.
Figure 1C:
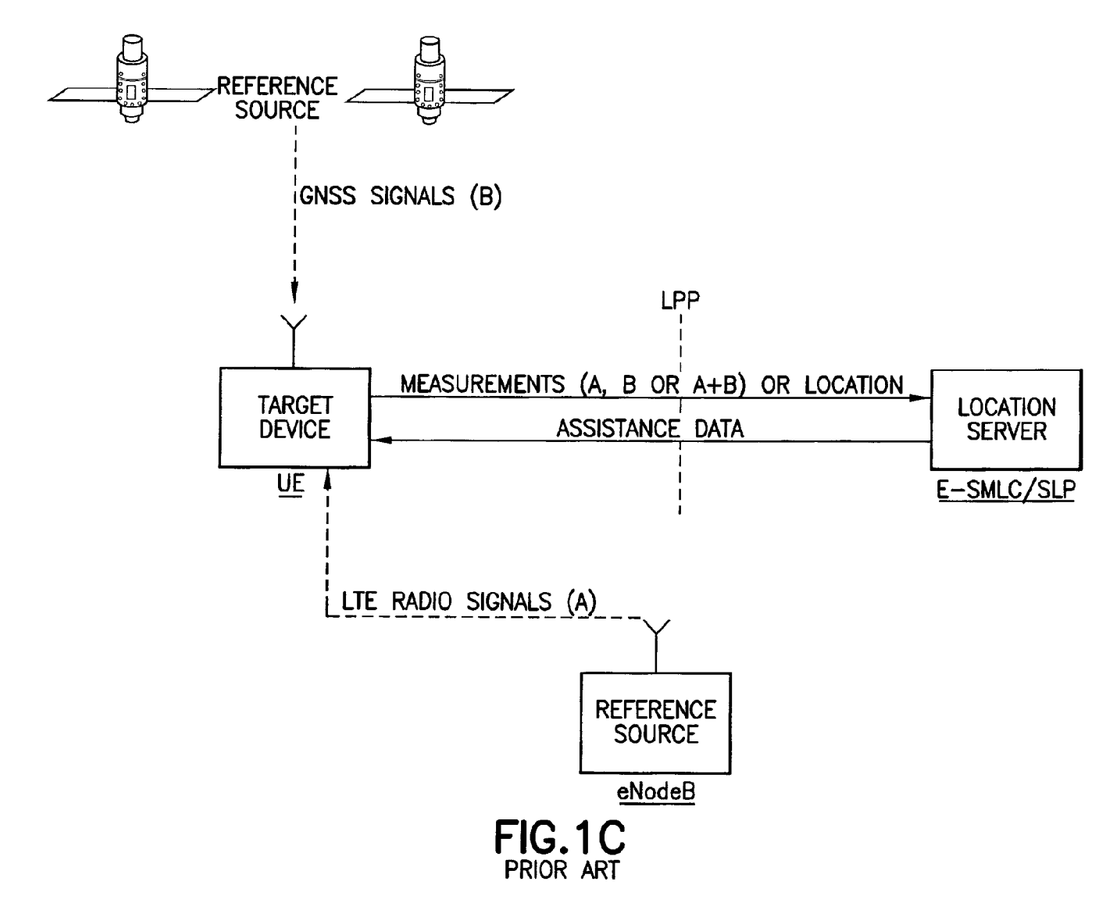
FIG. 1C is a prior art schematic block diagram showing signaling across a LPP interface between a UE and the location server in support of UE positioning, reproduced from FIG. 4.1.1-1 of 3GPP TS 36.355 v10.5.0.

The UE's location is kept in what is termed a location server, which can run several different positioning methods in parallel for a given UE. Two such positioning methods are termed the Observed Time Difference of Arrival (OTDOA) and the enhanced cell identity (ECID). FIG. 1A-C show the relevant E-UTRAN architecture, reproduced from FIGS. 5-1 and 5.1-1 of 3GPP TS 36.305 and FIG. 4.1.1-1 of 3GPP TS 36.355, respectively. The location server at FIG. 1A can be the Secure User Plane Location Platform (SLP) or the Enhanced Serving Mobile Location Center (E-SMLC).

The OTDOA is a downlink (DL) terrestrial positioning method specified in LTE Release 9 and is based on a UE performing DL Reference Signal Time Difference (RSTD) measurements using the Positioning Reference Signal (PRS) transmitted by the eNodeBs. There is also an uplink TDOA (UTDOA) method being standardized for Release 11. While the examples below focus on the former OTDOA method, it applies to the latter uplink TDOA method also. The PRS transmission from the eNodeBs is typically used for the UE to hear the neighbor eNodeBs and DL-TDOA accuracy is improved with more DL signals. For OTDOA the UE must first get a list of neighbor cells as assistance data from the location server to be able to perform the RSTD measurements, and it is typical to expect at least 3-4 to be transmitting within an area. The location server is responsible for selection of the neighbor cells to provide assistance data to the UE. The location server gets its information about neighbor cells either from operations and maintenance (O&M) or centralized self optimizing network (C-SON) configuration. Alternatively the location server can poll the individual eNodeBs to get the cell information. Specifics as to the signaling involved for the above information exchanges may be seen at 3GPP TS 36.305, 36.455 and 36.355 referenced above. The location server can provide assistance data to the UE or the UE can also request and get the assistance data from the location server. The location server polling the eNodeBs to get cell information for use as assistance data for the UE is done using LPPa protocol signaling, specifics which can be seen at 3GPP TS 36.455 referenced above.

The Enhanced Cell ID (E-CID) method is a serving cell based terrestrial positioning method that either uses DL measurements done by the UE of the serving cell (for example, reference signal received power RSRP, reference signal received quality RSRQ, UE receive-transmit Rx-Tx Time Difference) or UL measurements done by the serving eNodeB (for example, eNodeB Rx-Tx Time Difference and/or Angle of Arrival). In either of the above implementations for this method the serving eNodeB gets a LPPa Location Request message from the location server. Specifics as to this information exchange can also be seen at 3GPP TS 36.305 and 36.455 as referenced above.

A problem arises in that at least since Release 9 of the 3GPP standards for E-UTRAN, there is the possibility that some of the cells may be temporarily deactivated, and thus not available to support the UE's position measurements. The purpose of this deactivation feature is to save energy, for example where some base station was not transmitting during certain portions of the day (e.g., between midnight and 6 am) due to very low traffic volume. The time duration from a deactivation to reactivation may be for short time periods and vary widely as to when they occur during a day. So in practice there may not be a sufficient number of active neighbor eNodeBs for the UE to accurately fix its terrestrial location.

One possible solution is to not allow deactivation of nodes for energy savings, but this is wasteful when an eNodeB is active but essentially unused for extended periods of time. Another option is for the UE to determine its location with the serving cell and whatever other neighbor cells may be nearby and active, but the inaccuracies noted above with this approach may exceed certain mandates for location accuracy (for example, emergency calls for first responders) that are needed by other network functions.

SUMMARY

According to a first aspect of the invention there is a method comprising: changing status of a network access node from active to deactivated; and sending a message to a location server indicating the changed status.

In some embodiments the message is sent only when the status is changed for energy saving purposes at the network access node.

In some embodiments the network access node operates in an E-UTRAN system and the message sent to the location server is a LPPa protocol message.

In some embodiments the location server is one of an Enhanced Serving Mobile Location Center (E-SMLC) and a Secure User Plane Location Platform (SLP).

In some embodiments the message is sent asynchronous of any message exchange relating to user equipment positioning operations.

In some embodiments the method further comprises, in response to a serving network access node receiving from the location server a message to activate deactivated cells in a list included in a location request message, activating the deactivated cells prior to providing the list to a user equipment.

In some embodiments activating the cells comprises activating the cells for a probing or beacon mode in which the cell transmits at least a positioning reference signal but is incapable of establishing a connection with a user equipment.

In some embodiments activating the cells further comprises requesting at least one of the deactivated cells to adjust its antenna or antennas and/or transmit power to transmit over a known coverage pattern.

According to a second aspect of the invention there is an apparatus comprising at least one processor and at least one memory storing computer program code. In this aspect the at least one memory with the computer program code is configured with the at least one processor to cause the apparatus to at least: change status of a network access node from active to deactivated; and send a message to a location server indicating the changed status.

In some embodiments the message is sent only when the status is changed from active to deactivated for energy saving purposes.

In some embodiments the network access node operates in an E-UTRAN system and the message sent to the location server is a LPPa protocol message.

In some embodiments the location server is one of an Enhanced Serving Mobile Location Center (E-SMLC) and a Secure User Plane Location Platform (SLP).

In some embodiments the message is sent asynchronous of any message exchange relating to user equipment positioning operations.

In some embodiments the at least one memory with the computer program code is configured with the at least one processor to cause the apparatus to further, in response to a serving network access node receiving from the location server a message to activate deactivated cells in a list included in a location request message, activating the deactivated cells prior to providing the list to a user equipment.

In some embodiments activating the cells comprises activating the cells for a probing or beacon mode in which the cell transmits at least a positioning reference signal but is incapable of establishing a connection with a user equipment.

In some embodiments activating the cells further comprises requesting at least one of the deactivated cells to adjust its antenna or antennas and/or transmit power to transmit over a known coverage pattern.

According to a third aspect of the invention there is a memory storing computer program code. When such computer program code is executed by at least one processor, the resulting actions comprise: changing status of a network access node from active to deactivated; and sending a message to a location server indicating the changed status.

In some embodiments the message is sent only when the status is changed from active to deactivated for energy saving purposes.

In some embodiments the network access node operates in an E-UTRAN system and the message sent to the location server is a LPPa protocol message.

In some embodiments the location server is one of an Enhanced Serving Mobile Location Center (E-SMLC) and a Secure User Plane Location Platform (SLP).

In some embodiments the message is sent asynchronous of any message exchange relating to user equipment positioning operations.

In some embodiments the actions further comprise, in response to a serving network access node receiving from the location server a message to activate deactivated cells in a list included in a location request message, activating the deactivated cells prior to providing the list to a user equipment.

In some embodiments activating the cells comprises activating the cells for a probing or beacon mode in which the cell transmits at least a positioning reference signal but is incapable of establishing a connection with a user equipment.

In some embodiments activating the cells further comprises requesting at least one of the deactivated cells to adjust its antenna or antennas and/or transmit power to transmit over a known coverage pattern.

According to a fourth aspect of the invention there is a method comprising: at a location server, collecting from uplink messages and storing in a computer readable memory indications of which of a plurality of cells have a deactivated status; and utilizing the stored indications to ensure that all cells in a list provided to a user equipment for location assistance will have an active status.

In some embodiments the list of cells is sent by the location server in a Provide Assistance Data information element to the user equipment via a serving network access node of the user equipment.

In some embodiments for the case that at least one cell in the list has a deactivated status for energy savings, the method further comprises the location server signaling the serving network access node to activate the at least one cell that has the deactivated status.

In some embodiments the location server signals the serving network access node to activate said at least one cell that has the deactivated status for a probing or beacon mode which allows transmission of at least a positioning reference signal and which disallows establishing a connection with a user equipment.

In some embodiments the list is a first list having only cells with active status and the first list is sent in a first message that the location server sends in response to the location server receiving a first location request for the user equipment, and the method further comprises, in response to the location server receiving a second location request for the user equipment within a prescribed time interval, compiling a second list which includes at least one cell having a deactivated status and sending the second list in a second message for providing location assistance to the user equipment.

According to a fifth aspect of the invention there is an apparatus comprising at least one processor and at least one memory storing computer program code. In this aspect the at least one memory with the computer program code is configured with the at least one processor to cause the apparatus to at least: at a location server, collect from uplink messages and storing in a computer readable memory indications of which of a plurality of cells have a deactivated status; and utilize the stored indications to ensure that all cells in a list provided to a user equipment for location assistance will have an active status.

In some embodiments the list of cells is sent by the location server in a Provide Assistance Data information element to the user equipment via a serving network access node of the user equipment.

In some embodiments for the case that at least one cell in the list has a deactivated status for energy savings, the at least one memory with the computer program code is configured with the at least one processor to cause the apparatus to further signal the serving network access node to activate the at least one cell that has the deactivated status.

In some embodiments the location server signals the serving network access node to activate said at least one cell that has the deactivated status for a probing or beacon mode which allows transmission of at least a positioning reference signal and which disallows establishing a connection with a user equipment.

In some embodiments the list is a first list having only cells with active status and the first list is sent in a first message that the location server sends in response to the location server receiving a first location request for the user equipment, and the at least one memory with the computer program code is configured with the at least one processor to cause the apparatus to further, in response to the location server receiving a second location request for the user equipment within a prescribed time interval, compile a second list which includes at least one cell having a deactivated status and send the second list in a second message for providing location assistance to the user equipment.

According to a sixth aspect of the invention there is a memory storing computer program code. When such computer program code is executed by at least one processor, the resulting actions comprise: at a location server, collecting from uplink messages and storing in a computer readable memory indications of which of a plurality of cells have a deactivated status; and utilizing the stored indications to ensure that all cells in a list provided to a user equipment for location assistance will have an active status.

In some embodiments the list of cells is sent by the location server in a Provide Assistance Data information element to the user equipment via a serving network access node of the user equipment.

In some embodiments for the case that at least one cell in the list has a deactivated status for energy savings, the actions further comprise the location server signaling the serving network access node to activate the at least one cell that has the deactivated status.

In some embodiments the location server signals the serving network access node to activate said at least one cell that has the deactivated status for a probing or beacon mode which allows transmission of at least a positioning reference signal and which disallows establishing a connection with a user equipment.

In some embodiments the list is a first list having only cells with active status and the first list is sent in a first message that the location server sends in response to the location server receiving a first location request for the user equipment, the actions further comprises, in response to the location server receiving a second location request for the user equipment within a prescribed time interval, compiling a second list which includes at least one cell having a deactivated status and sending the second list in a second message for providing location assistance to the user equipment.

DETAILED DESCRIPTION

The examples below are in the context of the E-UTRAN system, often referred to as long term evolution or LTE. This context is not limiting to the broader teachings herein, and so the specific names of radio access technologies, of messages, interfaces, network entities and the like are provided for clarity of explanation and do not imply the described techniques and principles which are detailed below by example are limited to only the named radio access technology, message, interface and/or network entity.

As noted above, for various reasons such as energy savings it may be that at certain times one or more cells which a UE or LS might rely on to support its positioning operations may be offline, dormant, or deactivated. We define a E-UTRAN cell deactivation to mean at least the Uu interface signals and channels are not transmitted. The E-UTRAN cell indicates its deactivation to neighbor eNodeBs via a Deactivation Indication IE contained in Served Cells To Modify IE sent in the ENB CONFIGURATION UPDATE message over the X2 interface which goes directly between the eNodeBs (see FIG. 2). A Cell State Indication IE is used to notify inter-RAT nodes (e.g. UMTS/GERAN) of a deactivated cell via the S1 interface to the MME and the RIM procedure. Additionally, updates are made to O&M and C-SON (if present) to indicate the deactivation as well. In the LTE system a CELL ACTIVATION REQUEST message is sent over the X2 interface by a coverage cell to reactivate a dormant capacity booster cell node, for example when the coverage cell load surpasses a load threshold, in order that the dormant cell can transmit and receive over the Uu interface which links the UE to the radio access network.

The teachings below solve the problem of how to detect dormant cells, and trigger the activation of such cells when they are deactivated for example for energy savings, given that the UE positioning needs them to be activated. These teachings efficiently manage both the energy savings mechanism and the location determination where some existing cells are dormant, regardless of whether the dormant cell is a macro cell or micro cell or a pico cell or femto/HeNB cell (or any other type). In TS 36.423 the different possible cell types corresponding to different cell sizes or coverage areas are given as large, medium, small, and very small.

Figure 2:
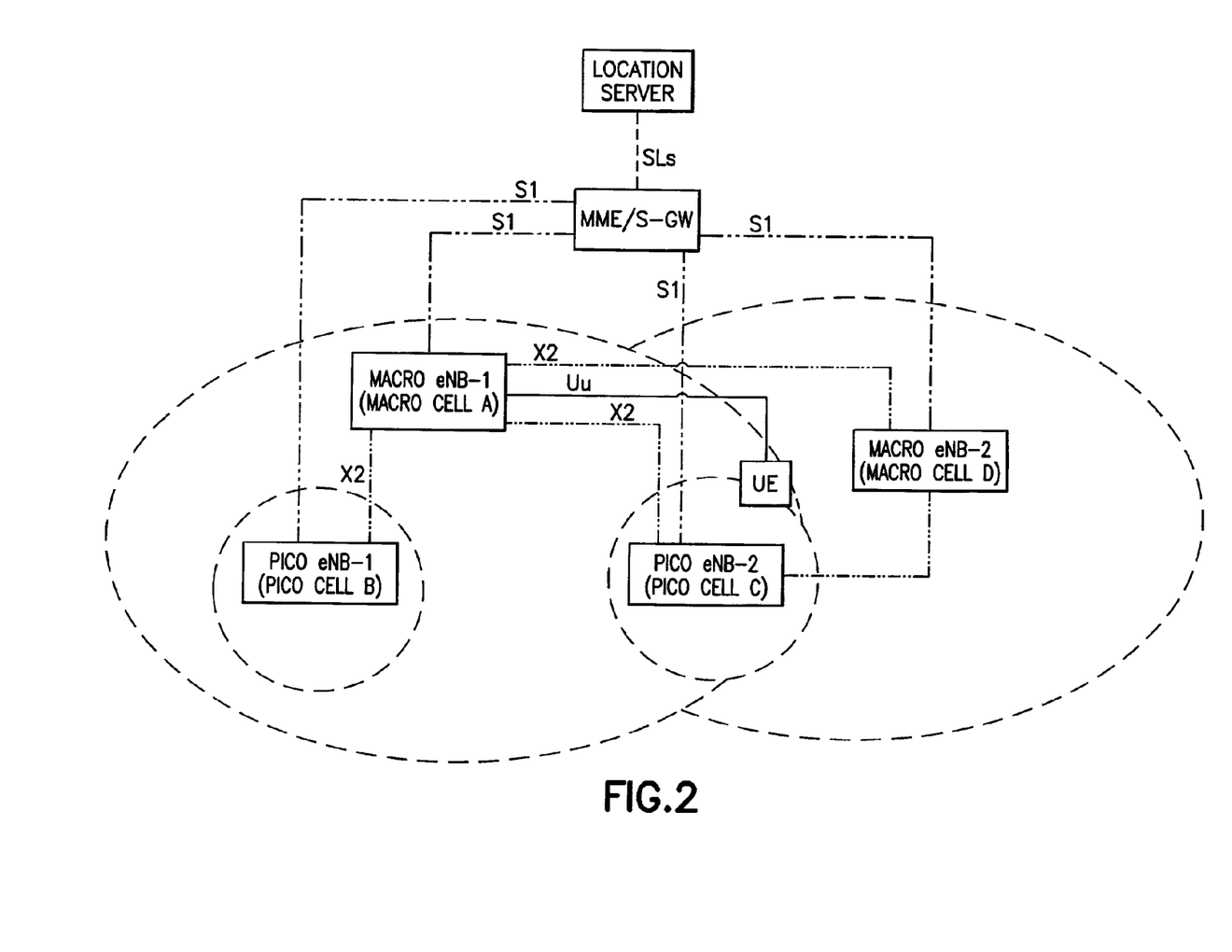
FIG. 2 is a schematic block diagram showing a UE in proximity to two E-UTRAN cells and two pico cells in relation to a mobility management entity and a location server, and is an exemplary radio environment in which exemplary embodiments of these teachings may be practiced to advantage.

FIG. 2 illustrates one non-limiting radio deployment which provides a context relevant to these teachings. There is a UE attached to a serving cell which in FIG. 2 is macro eNodeB-1 (eNB-1), or macro cell A. Within the coverage area of macro cell A are pico eNodeB-1 (pico cell B) and pico eNodeB-2 (pico cell C), and adjacent to macro cell A is macro cell D which is controlled by macro eNodeB-2. The pica cells B and C operate at a lower transmit power than the macro cells A and D, and such a mixture of different cell sizes is commonly referred to as a heterogeneous network.

There is an X2 interface (for data and control) directly between the macro eNodeBs, and between the macro eNodeB-1 and its two pico cells pico eNodeB-1 and pico eNodeB-2. There is also an X2 interface between pico eNB-2 and Macro eNB-2. There is also a S1 interface between each macro and pico eNodeB and the mobility management entity (MME) which in the FIG. 2 deployment also happens to be co-located with the serving gateway (S-GW) that provides access to further networks such as the Internet via a PDN-GW (not shown). There may also be an SLs interface between the MME and the location server, which in FIG. 1A is the E-SMLC, or in network deployments without the E-SMLC the SLP shown at FIG. 1A may operate as the location server.

The X2 interface is used in part to indicate cell deactivations to neighbors, and is also used to activate dormant eNodeBs for inter-LTE eNodeBs. The S1 would be used to indicate cell deactivations to legacy RAT neighbors and to activate dormant eNodeBs via a legacy GERAN/UMTS node in an inter-RAT energy savings case. Beyond these 3GPP Release 11 options there are of course other possibilities and other types of network nodes such as wireless local area network (WLAN) access points (APs) which could use a similar concept once interfaces between eNodeBs and APs are developed (assuming AP deactivations are used).

Assume for FIG. 2 that the UE is sufficiently close to neighbor cells C and D that it can use them for assistance in its location procedures and no other neighbor cells are close enough, and assume further that those two cells as well as the serving cell A are necessary for the UE to fix its location with a minimum required accuracy. In practice the UE will typically utilize a minimum of four cells but the above simplified assumptions are sufficient for purposes of explanation. If for example cell C goes deactivated at the time the UE needs to fix its position, the UE will be unable to do so with sufficient accuracy given these assumptions.

As will be detailed further below, according to these teachings there is an indication of cell active/deactive status sent to the location server. It is possible a cell is deactive for other reasons than for energy savings, e.g. because of a cell outage due to a hardware or software problem. It is assumed here that the deactive status is due to energy savings reason and a suitable means to distinguish reasons for a deactivated cell may exist, i.e. the deactivated indication status may in practice be more explicit such as "deactivated for ES". The location server may separately be made aware of cells not activated due to cell outage reasons as their deactivated status may also be beneficially used by the LS positioning algorithms, but such cell(s) if deactivated due to e.g. a HW fault cannot be activated by the CAR message. With this information the location server can determine whether one or more deactivated cells needs to be reactivated to support the UE's positioning procedures. In the examples below the location server informs the serving eNodeB which cell or cells to re-activate in a LPPa message. LPP is the location positioning protocol in the E-UTRAN system, and the LPPa is an interface that goes between the eNodeB and the E-SMLC so in FIG. 2 the LPPa interface runs along the S1 interface between the eNodeB and the MME and also along the further SLs interface between the MME and the E-SMLC/location server.

The examples below detail two different types of LPPa messages for this purpose. In a first embodiment the relevant LPPa message is a control plane message. In a second embodiment the relevant proprietary message is between the SLP and the E-SMLC, where the information added by these teachings to the conventional LPPa message can be obtained and provided to the SLP via the E-SMLC (assuming there is a E-SMLC in a given network deployment). The E-SMLC currently interfaces to the SLP via a proprietary interface as FIG. 1A indicates.

To simply override the cell deactivation without further consideration ignores that the cell may have been deactivated originally for energy saving purposes. Such energy saving cell deactivation can be done centrally or distributed. Where centralized, the O&M makes the determination of cell status and the O&M interfaces are used to activate and deactivate cells. In the distributed energy saving cell deactivation technique, the eNodeBs make cell status determinations and the X2 and S1 interfaces are used as noted above. A more elegant solution for cell reactivation will take into account the need for energy savings also, and so the solutions presented by example herein address the interaction between the energy saving function that involves turning off a cell radio transmit/receive functions and the positioning feature in the LTE E-UTRAN system.

Cells which have been deactivated for energy savings reasons may be appropriate for reactivation, in full or part. This reactivation may be needed because the UE positioning requires it (for example, the UE cannot fix its position absent one or more additional active cells), or because the UE has attempted to fix its position but was unable to do so with a sufficient minimum accuracy.

According to the exemplary embodiments of these teachings there is a mechanism for eNodeBs to indicate a change of their cell status (activated/deactivated) to the location server. In the location server there is also additional intelligence for the location server to better manage the selection of cells, depending on the indicated cell status. This enables the location server to better provision assistance data to the UE, namely so that only cells in the activated state are provided in the assistance data to the UE. The location server may further benefit from knowing that a UE is within the coverage area of a small cell (for example, pico cell C in FIG. 2) even if that small cell has been sent dormant per the energy saving function. If the location server determines that the assistance data to be provided to the UE requires cells to be activated, then the teachings below also provide a mechanism for the location server to trigger an eNodeB to activate the dormant cell or cells (either directly, or indirectly via O&M). These are detailed separately below.

Indicating a Change of Cell Status

In the E-UTRAN UE positioning architecture summarized at FIGS. 1A-C the eNodeB and location server use the LPPa protocol to communicate with each other over a logical interface that is transported over the S1 interface which goes between the eNodeB and the MME as shown at FIG. 2, and also the SLs interface which goes between the MME and the E-SMLC as shown at FIG. 1A. Overall this logical interface is sometimes called the LPPa interface. The LPPa interface is therefore terminated at the eNodeB and the E-SMLC, and it is transparent to intermediate nodes such as the MME. Implementing these teachings specifically in an E-UTRAN system involves enhancing the LPPa protocol to allow signaling the status of cells of an eNodeB to the location server. In one particular embodiment this is an asynchronous procedure, performed in the background independent of any actual UE positioning transactions.

Triggering of this LPPa signaling of the status of cells to a location server can in an embodiment depend on the changes in cell status at the eNodeB, for example as determined by the energy savings function. In this regard some implementations can utilize a new LPPa message for this purpose whereas other implementations can use an existing LPPa message modified for indicating activated/deactivated status changes. The O&M interface can also be used for this purpose, though the more direct LPPa protocol techniques noted above are a bit more generic since they can more easily address the distributed energy saving function. In general O&M (including the CSON function) based solutions are best fitted for collecting data and statistics over a broad range and time period, then analyzing them before making complex corrections. The peer to peer X2 interfaces or S1 interface is faster (e.g. within ms) for conveying information among neighbors about a particular event confined to adjoining eNodeBs, especially where changes could be rapid. O&M is not so efficient at handling real time state notification data and relaying the information to other nodes, and for that reason the non-limiting examples presented in these teaching utilize LPPa messaging.

Managing Cell Selection by the Location Server

From the above LPPa messages the location server will have knowledge of the various cells and their status as active or deactivated. The location server is the entity that chooses which cells are to be used by the UE for neighbor cell assistance in determining the UE location, and so based on this status knowledge the location server can assure that the list of cells for location assistance that it provides to the UE are active cells. In the E-UTRAN system the location server can provide this in the Observed Time Difference of Arrival (OTDOA) ProvideAssistanceData information element, which is an LPP message such as the LPP packed data unit (PDU). From this list of cells which the location server has confirmed are all active (or which the location server's signaling will change them to active as detailed below), the UE can perform DL measurements on the transmission of those cells' signals.

Currently the E-UTRAN specifications leave some discretion to the location server for how it selects the neighbor cells to include in its neighbor cell list for location assistance. These teachings may be implemented for example by making explicit in such specifications that the location server check the cells' active/deactivated status and include in its location assistance list only those cells whose status is active, which the location server learns from the cell status indications that are detailed above. Or as will be detailed, any cells in the list that are deactivated are to be activated in time to transmit its positioning reference signals for the UE to measure. The location server may also use the cells' active/deactivated status as detailed above to choose alternate cells than it normally would based on some cell being deactivated, e.g. cells on other carriers that are activated, and use the alternate cells in its location assistance list to the UE.

Consider the location request shown at FIG. 1B. According to a specific embodiment of these teachings, if the first location request and subsequent attempt by the UE did not achieve the required level of accuracy for the UE's location, the location server can then send a second location request for the same UE, where the second request includes the dormant cells which the location server specifically excluded from its first neighbor cell list. In this embodiment there is a predetermined maximum time interval, between either when the UE reports it location and the second request or between the first request and the second request, during which the location server will send that second request with the dormant cells.

Triggering Activation of Deactivated Cells

If the location server decides to use the downlink time difference of arrival method and plans to include cells that at the moment are dormant in the assistance data sent to the UE over the LPP interface, then the location server should first signal the radio access network to activate those dormant cells. The cells are identified by their signature sequence, either physical cell identity (PCI) or the E-UTRAN Cell Global Identifier ECGI.

In order to maintain a clear separation of the energy savings cell management function at the eNodeB and the UE positioning function at the location server, in a particular embodiment of these teachings the location server indicates a list of cells to the serving eNodeB using LPPa signaling. This separation is seen to be an advantage over the location server directly activating cells, for example by having the location server directly sending a Cell Activation Request type of message to the dormant cells. In one embodiment the list of cells sent to serving eNodeB includes only the cells that are dormant, or in a different embodiment the list may contain both active and dormant cells. In either case the eNodeB receiving the list will activate the cells in that list that are dormant. In the E-URAN system an eNodeB providing coverage for capacity booster cells can activate dormant capacity booster cells in a neighbor eNodeB (such as for example pico cell C of FIG. 2) using the X2 Cell Activation Request (CAR) message, which is sent over the X2 interface and specified in 3GPP TS 36.423 v11.0.0 (2112-06). Currently only a cell capable of providing backup coverage for a capacity booster cell which can go dormant for ES is expected to send a CAR message, but in these teachings the serving eNB of the UE may use the Cell Activation Request (CAR) message to activate a dormant neighbor cell even if it is not the cell providing coverage for the dormant neighbor cell. The Cell Activation Request (CAR) message may include an additional information element (IE) for this purpose as well as (optionally via another additional IE) that the cell is not to be fully reactivated and not allow UE's to connect with the eNB, but rather reactivated for UE positioning purposes only.

Thus in an embodiment of these teachings some of the energy savings sought by deactivating a cell can be preserved despite the cell being reactivated. Specifically, any given cell need not be fully reactivated as is currently the case when a CAR message is employed, but by these teachings a cell can be reactivated only partially. For example, the CAR message is modified in one embodiment to include a new (optional) information element that requests the cell enter a "probing" or beacon mode in which the cell transmits the minimum information needed in order for the UE to make signal measurements of that partially activated cell. For example, such minimum information might in one embodiment include reference signals (RSs), primary and secondary synchronization signals (PSS/SSS), and positioning reference signals (PRSs). The Broadcast Control Channel (BCCH) may be needed as well in some embodiments for the UE to make measurements according to the current specifications. It should be understood it is possible that new LTE signals and/or channels may be created that are optimized for only allowing or aiding UE's to make measurements suitable for determining UE position without any additional overhead enabling UE's to connect to the cell given the cell is only being activated to enable UE measurements. Reducing overhead has the further advantage of reducing interference to neighbors. In such a probing/ beacon mode the cell is incapable of having connections established to any UEs, and so there is still quite a bit of energy savings retained for the newly activated cell.

In this partial-activation embodiment, also the probing/beacon mode can be valid for only a short period of time, on the order of a few seconds which is sufficient for the UE to make measurement(s). After this partially-active interval the eNodeB automatically returns to its previous dormant energy saving state. In this case the neighbor nodes need not be informed that the cell has been activated since a) it is short lived and b) it is not considered desirable to hand over UE's to the cell by the energy savings function given the backup coverage provided by another cell is deemed sufficient. The time duration the cell is to transmit to allow for making the UE measurements may be added to the CAR message via a new IE with a value optimized for this particular task. The X2: CELL ACTIVATION REQUEST message can be modified to enable it to place the eNodeB in this new mode. In an embodiment this mode may be understood to be a new carrier type, and in fact in this new probing mode rather than the probing eNodeB sending the RS/PSS/SSS and PRS it may only send the PRS (using the PRS configuration sent to the UE). Such a limited transmit capability for an eNodeB to enable only the UE to make measurements of limited transmissions can be specified in an optional information element in the X2 access point CAR message, or this limited mode can be specified via a new X2 message. If the cells cannot be activated due to a reported hardware and/or software failure at the node rather than the cell being deactivated for an energy saving purpose, or if the serving cell does not have an X2 interface setup to some cells or for other reasons at the cell or eNB, then a failure with an appropriate reason may be reported to the location server via the serving eNB and a LPPa procedure.

In an alternative embodiment the location server can signal the O&M about cells that need reactivation, and in response the O&M triggers activation of dormant cells. In this embodiment also the activation can be full activation or only activation to allow UE measurements (sometimes called probing mode).

The location server can choose to use either the uplink or the downlink enhanced cell ID (E-CID) positioning method rather than the OTDOA method detailed above. In this case, upon receiving a LPPa Location Request message from the location server, the serving eNodeB will determine whether better accuracy can be obtained by reactivating some small cells (such as pico cell C in FIG. 2) and having the UE make measurements thereof in order to see if the UE is within any of those small cells' coverage area. In this case, in order to obtain a desired and repeatable accuracy of the positioning result the serving eNodeB would activate all of its small cells within the serving eNodeB's coverage area, or at least a) all those small cells that are deactivated for energy savings, and b) which are also relatively near the subject UE and compatible with it (radio access technology, etc.). For example, if there is a heterogeneous network (HetNet) deployment which has one or more small cells dormant (pico cells B and C in FIG. 2), the serving macro eNodeB may reactivate all or some of the dormant pico cells to see if the UE is within the coverage area of one of the pico cells.

This may be triggered by the serving eNodeB first determining the general area within the macro coverage that the UE appears to be within, and this determination can be based on one or more E-CID methods (for example, timing advance, round trip time, angle of arrival, etc.). If a pico cell is dormant in the estimated general area of the UE, the macro eNodeB then activates any such dormant small cells, waits for associated UE measurements to occur and reports any strong UE measurements of those small cells as part of the E-CID information response to the location server. The position of small cells within the serving eNodeB coverage area is typically known by the location server. The small cells may be on the same or different carrier frequencies as the UE is currently connected. The UE measurements of its neighbor cells may include cells which are operating on a different radio access technology (for example, GERAN or WIFI) so long as the UE is compatible with that technology also in order to measure the signals from them. Requesting the UE to make measurements on different frequencies or different technologies may have costs in terms of additional time and increased battery usage, so the eNodeB may need to judge the cost of these disadvantages with the potential improved positioning accuracy based on factors such as needed position accuracy, UE battery cost to measure other frequencies, the needed response time as non-limiting examples. The serving eNodeB can report this new information by modifying the LPPa response message to include a new (optional) information element which contains measured cells whose measured signals are above some minimum power threshold as well as the reported powers themselves (for example, reference signal received power RSRP). As with the description for the OTDOA implementations above, for the E-CID method also the activated small cells may not be fully activated but rather be put into a probing mode as detailed further above. In this probing or beacon type mode UE connections can be prevented to the cell when the cell is activated only as a UE positioning aid. This connection prevention can be implemented by having the probing mode cell refrain from transmitting its master information block (MIB) and system information blocks (SIBS), or alternatively the cell may be listed as barred by setting the cellBarred attribute in SIB2 to barred or by other suitable methods.

A further teaching involves requesting antenna adjustments at cells intended dormant for energy savings reasons by the energy savings function that are being reactivated for UE measurement purposes. The purpose is to enable additional means to detect the small pico cell while updating the location indicated by detecting the small cell because when the antenna adjustments are made the coverage of the cell is geographically shifted. The serving eNB requests antenna adjustments known to map to adjusted coverage areas and provides for separate UE measurements of the adjustments. For example, the eNB the UE is connected to coordinates this via sequential separate procedures for n different antenna adjustments at the partially reactivated pico: for example a first procedure activates the pico cell for producing the normal coverage area and have the UE perform UE measurements for some time period T; and a second procedure is to request the pico cell adjust its antenna(s) and/or power to some known coverage pattern A and wait for the UE to perform measurements for the time period T. Then there can also be a third procedure to request the pico cell to adjust its antenna(s) and/or power to some different known coverage pattern B and wait for the UE to perform measurements for the period T. This can continue in subsequent nth procedures: request the pico cell to adjust its antenna(s) and/or power to some coverage pattern n and wait for UE to perform measurements for period T. The serving cell then reports back to the LS any coverage pattern(s) detected by the UE along with the reported detected power. The antenna adjustment may involve transmission power adjustments and/or antenna tilt adjustments, and any other suitable adjustments in order to allow a UE to probe for the pico cell which was activated for making such measurements using the adjusted coverage areas. By using the UE detection of one or more adjusted coverage areas and further knowing the overlap between the different coverage areas, improved accuracy with respect to the UE location becomes possible at the LS.

There may be cases in which the location server requires all cells within an area to be activated and a new indication sent (via new IE or mgs) to a serving macro eNodeB to reactivate all small cells it covers. Such an indication can be in a new information element added to a conventional LPPa message or it may be in a new message. One example where this may arise is where there may be numerous emergency calls indicating some widespread emergency such as an earthquake or building collapse. Wireless coverage is never perfect, especially inside buildings. So if the location server needs to detect a UE's position, or gets multiple emergency calls from the same general areas in a compressed time span, it can reactivate all the dormant nodes in an area not only for UE positioning determination but also to ensure as complete a wireless coverage as possible exists in the area so all UE's trying to report an emergency over the LTE network can in fact do so.

Another instance where activating all small cells may be important is where multiple reported positions are seen to be biased in the same manner which leads one to suspect that assumptions as to accuracy and error estimation are no longer valid when the neighbor nodes are deactivated. Deactivating too many nodes for energy savings may undermine those assumptions and so biases calculations that rely on those same assumptions. Proximity detection that might be expected in a certain location cannot happen if the node is off. Self learning and finger printing techniques that build up knowledge of the environment at informational databases could be tainted if nodes assumed activated are dormant. The data learning/finger print mapping which may be based on a certain set of activated cells may need the whole set of cells activated to work properly. In this case also the location server can reactivate all the cells in the area used by the data learning/finger print mapping that are deactivated for energy savings.

In this regard accuracy of the data learning/finger print mapping or of the positioning may be preserved by having the E-SMLC request the C-SON and the eNodeBs not to allow a certain cell to go dormant based on knowledge that if a cell goes dormant the UE positioning would be significantly affected. One way to implement this is for O&M (possibly through the serving eNodeB) to turn off the energy saving function at the cell (e.g. esSwitch in 32.522). Further, to implement this technique in the appropriate radio standards for E-UTRAN would entail adding further steps to the downlink Non-UE Associated LPPA Transport (S1) and LPPA PDU (SLs) protocols. The knowledge of which cells are critical may be gained from reactivating all cells as above and then deactivating selective ones and checking for a repeat of the biasing error which caused the location server to reactivate all cells in the first place.

Figure 3:
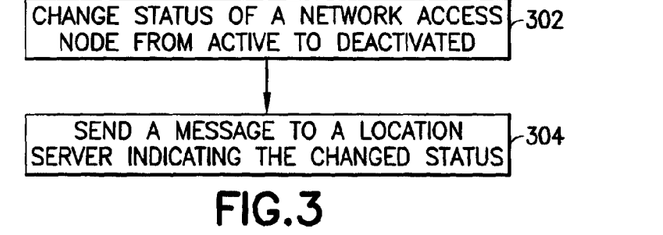
FIG. 3 is a logic flow diagram that illustrates the operation of a method, and a result of execution of computer program instructions embodied on a computer readable memory, in accordance with some of the exemplary embodiments of this invention.

FIG. 3 is a logic flow diagram that illustrates the operation of a method, and a result of execution of computer program instructions, in accordance with the exemplary embodiments of this invention from the perspective of the radio access network. The elements of FIG. 3 may be performed by one access node in the radio access network such as some access node which deactivates for energy savings purposes, by O&M, or by the UE's serving access node.

In accordance with these exemplary embodiments at block 302 some network access node changes its status between active to deactivated; and at block 304 the network access node sends a message to a location server indicating the changed status.

In one of the non-limiting embodiments above the message of block 304 is sent only when the status is changed for energy saving purposes at the network access node, and in those examples the network access node operated in an E-UTRAN system and the message sent to the location server was a LPPa protocol message. Also above it was detailed that the location server could be one of an Enhanced Serving Mobile Location Center (E-SMLC) and a Secure User Plane Location Platform (SLP).

In another example embodiment detailed above the message is sent asynchronous of any message exchange relating to user equipment positioning operations. Other embodiments above described that the serving network access node, in response to receiving from the location server a message to activate deactivated cells in a list included in a location request message, the serving network access node will activate the deactivated cells and indicate the success or failure to activate the cells to the LS prior to the LS providing the list to a user equipment via LPP. Above is further detailed that in one embodiment activating the cells comprises activating the cells for a probing mode in which the cell transmits at least a positioning reference signal but is incapable of establishing a connection with a user equipment.

Figure 4:
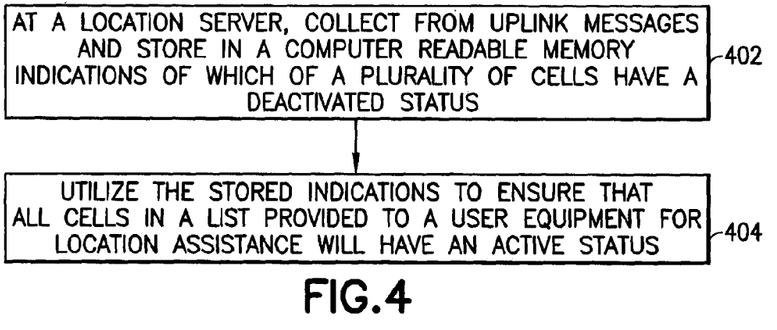
FIG. 4 is a logic flow diagram that illustrates the operation of a method, and a result of execution of computer program instructions embodied on a computer readable memory, in accordance with other of the exemplary embodiments of this invention.

FIG. 4 is a logic flow diagram that illustrates the operation of a method, and a result of execution of computer program instructions, in accordance with the exemplary embodiments of this invention from the perspective of the location server. In accordance with these exemplary embodiments at block 402 a location server collects from uplink messages and stores in a computer readable memory indications of which of a plurality of cells have a deactivated status. Then at block 404 the location server utilizes the stored indications to ensure that all cells in a list provided to a user equipment for location assistance will have an active status. Note that this does not require the list contain only cells with an active status, only that they will have an active status when needed by the UE for location assistance. In certain embodiments above one or more cells on this list have a deactivated status according to what is stored in the memory of the location server, but in these examples the location server informs the serving access node to activate those cells prior to providing the list.

In the specific non-limiting examples above the list of cells is sent by the location server in a Provide Assistance Data information element LPP message to the user equipment. In one of the specific embodiments where at least one cell in the list has a deactivated status for energy saving purposes, the location server further signals via the LPPa interface the serving network access node to activate the at least one cell that has the deactivated status. In one embodiment the LS will receive deactivation messages from the various eNBs which indicate a reason for the deactivation, whether for energy savings or for some hardware/software malfunction or maintenance. And also above in one embodiment the location server signals the serving network access node to activate the cell or cells that have the deactivated status for a probing mode which allows transmission of at least a positioning reference signal and which disallows establishing a connection with user equipments.

In another example embodiment above the deactivated cells were only sent in a second list. In this example the list stated at block 404 of FIG. 4 is a first list having only cells with active status and the first list is sent in a first message that the location server sends in response to receiving a first location request for the user equipment. In this embodiment then, in response to the location server receiving a second location request for the user equipment within a prescribed time interval, it compiles a second list which includes at least one cell having a deactivated status and sending the second list in a second message for providing location assistance to the user equipment.

The various blocks shown in FIG. 3-4 may be viewed as method steps, and/or as operations that result from operation of computer program code, and/or as a plurality of coupled logic circuit elements constructed to carry out the associated function(s).

Figure 5:
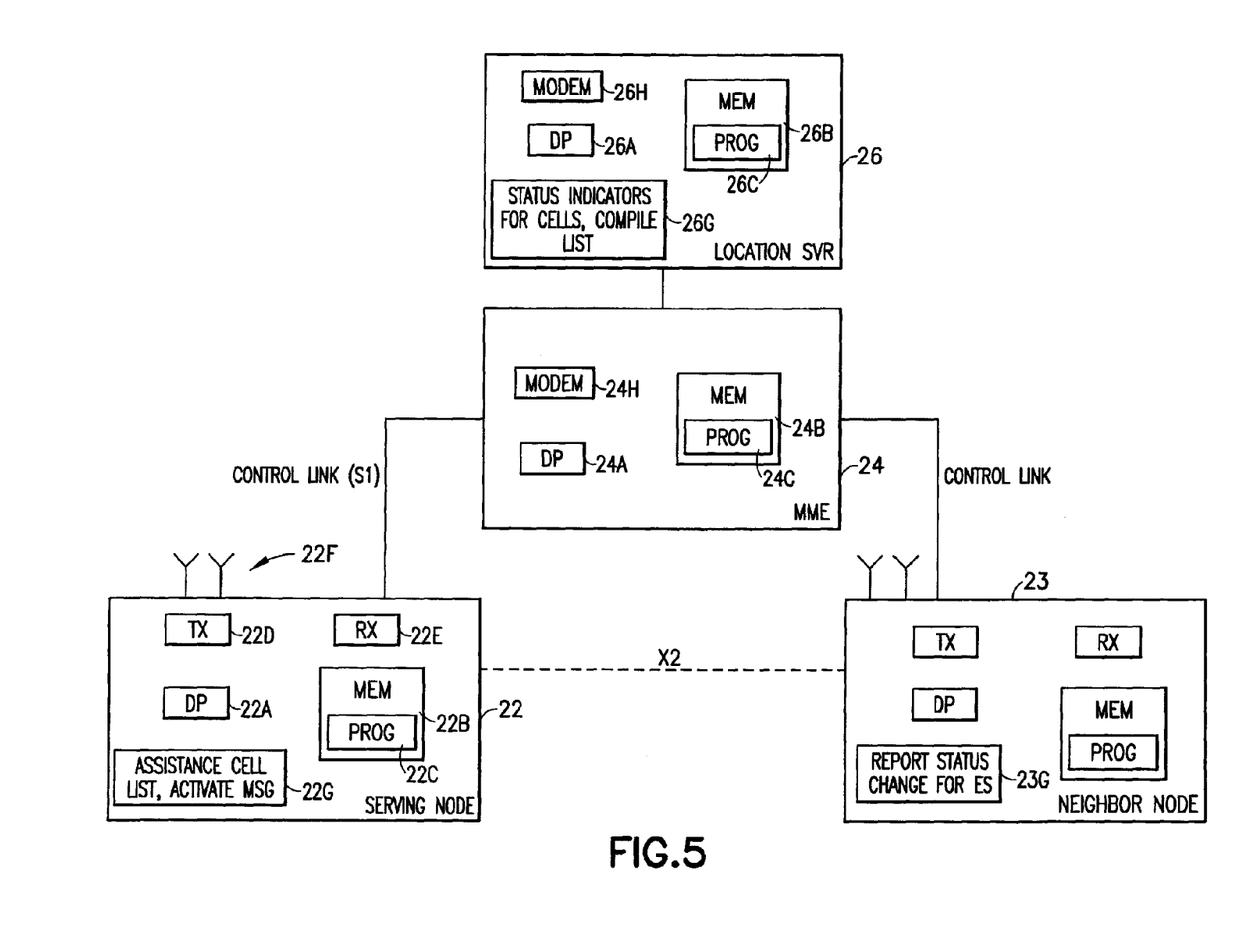
FIG. 5 is a simplified block diagram of various electronic devices that are suitable for use in practicing the exemplary embodiments of this invention.

Reference is now made to FIG. 5 for illustrating a simplified block diagram of various electronic devices and apparatus that are suitable for use in practicing the exemplary embodiments of this invention. In FIG. 5 a serving cell 22 is adapted for communication over a wireless link with a mobile apparatus, such as a mobile terminal or UE (not shown). The serving cell 22 may be implemented as the eNodeB of an E-UTRAN system as is shown at FIG. 2, or any access node of the E-UTRAN or other radio access technology system including remote radio heads and repeaters. The serving cell 22 may interface to the core network and the location server 26 through a mobility management entity MME that may be co-located with a serving gateway GW 24.

The serving node 22 includes processing means such as at least one data processor (DP) 22A, storing means such as at least one computer-readable memory (MEM) 22B storing at least one computer program (PROG) 22C, and also communicating means such as a transmitter TX 22D and a receiver RX 22E for bidirectional wireless communications with the UE via one or more antennas 22F. Also shown for the serving node 22 at block 22G is the assistance cell list which the serving cell 22 receives from the location server and provides to the UE, and further at block 22G the serving node 22 has messages to activate any of the cells on the list that are indicted as being deactivated.

For completeness there is shown one of several neighbor nodes 23 which includes its own processing means such as at least one data processor (DP), storing means such as at least one computer-readable memory (MEM) storing at least one computer program (PROG), and communicating means such as a transmitter TX and a receiver RX for bidirectional wireless communications with other UEs under its control via one or more antennas. This neighbor node 23 has a program 23G embodied in its MEM to report any changes in its status (active/deactivated) to the location server 26 at least whenever those status changes are for energy saving ES purposes.

Similarly, the MME 24 includes processing means such as at least one data processor (DP) 24A, storing means such as at least one computer-readable memory (MEM) 24B storing at least one computer program (PROG) 24C, and communicating means such as a modem 24H for bidirectional communication with the serving node 22 via the control link and also with the neighbor node 23 over the other control link. In an LTE embodiment these control links are implemented as S1 interfaces, and as noted above there may also be a direct LPPa interface between the network access nodes 22, 23 and the location server 26.

While not particularly illustrated for the serving or neighbor nodes they also are assumed to include as part of their wireless communicating means a modem; for those devices it is assumed to be inbuilt with the TX and/or RX.

The location server 26 includes processing means such as at least one data processor (DP) 26A, storing means such as at least one computer-readable memory (MEM) 26B storing at least one computer program (PROG) 26C, and communicating means such as a modem 26H for bidirectional communication with the GW 24 and/or the network access nodes 22, 23. The location server 26 has stored in its local memory at 26G the status indicators for the various cells which it collects via the status reports shown at 23G for the neighbor node 23, and these indicators are used when the location server 26 compiles the list of cells for position assistance for the UE. In some embodiments the location server chooses only active cells to include in the list, in others it instructs/requests the serving node to activate the deactivated cells which the location server includes in that list.

At least one of the PROGs 22G/23G/26C in the serving node 22/neighbor node 23/location server 26 is assumed to include program instructions that, when executed by the associated DP 22A/26A, enable the device to operate in accordance with the exemplary embodiments of this invention, as detailed above. In these regards the exemplary embodiments of this invention may be implemented at least in part by computer software stored on the MEM 22B, 26B which is executable by the DP 26A of the location server 26 and/or by the DP 22A of the respective serving node 22 and/or neighbor node 23, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware, DP, or various combinations thereof.

Various embodiments of the computer readable MEMs 22B, 24B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 22A, 24A and 26A include but are not limited to general purpose computers, special purpose computers, microprocessors, digital signal processors (DSPs) and multi-core processors.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of the EUTRAN and LTE systems, it should be appreciated that the exemplary embodiments of this invention are not limited for use with only these two particular radio access technologies and these teachings may be used to advantage in other wireless communication systems which utilize private networks and access nodes.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
at least one processor; and
at least one memory storing computer program code;
in which the at least one memory with the computer program code is configured with the at least one processor to cause the apparatus to at least:
change status of a network access node from active to deactivated;
send a message to a location server indicating the changed status; and
activate, in response to a serving network access node receiving from the location server a message to activate deactivated cells in a list included in a location request message, the deactivated cells prior to providing the list to a user equipment,
wherein activating the cell comprises activating the cell for a probing or beacon mode in which the cell transmits at least a positioning reference signal but is incapable of establishing a connection with a user equipment.

2. The apparatus according to claim 1, in which the message is sent asynchronous of any message exchange relating to user equipment positioning operations.

3. The apparatus according to claim 1, wherein the message to activate the cell is received in a location request message comprising a list of one or more cells to activate, and wherein the cell is activated prior to providing the list to a user equipment.

4. The apparatus according to claim 1, in which activating the cell further comprises requesting the cell to adjust its antenna or antennas and/or transmit power to transmit over a known coverage pattern.

5. The apparatus according to claim 1, wherein the message comprises a time duration of the cell activation.

6. The apparatus according to claim 1, wherein the message is sent only when the status is changed from active to deactivated for energy saving purposes.

7. The apparatus according to claim 1, wherein the network access node operates in an E-UTRAN system and the message sent to the location server is an LPPa protocol message.

8. The apparatus according to claim 7, in which the location server is one of an Enhanced Serving Mobile Location Center (E-SMLC) and a Secure User Plane Location Platform (SLP).

9. An apparatus comprising:
at least one processor; and
at least one memory storing computer program code;
in which the at least one memory with the computer program code is configured with the at least one processor to cause the apparatus to at least:
cause, in response to a first and a second location request for one user equipment received at a location server within a prescribed time interval, providing to the one user equipment at least one cell having deactivated status in a list of cells provided for location assistance; and
cause activation of the at least one cell by the serving network access node.

10. The apparatus according to claim 9, wherein the list of cells is sent by the location server in a Provide Assistance Data information element to the one user equipment via a serving network access node of the one user equipment.

11. The apparatus according to claim 9, wherein the at least one cell is activated for a probing or beacon mode in which the cell transmits at least a positioning reference signal but is incapable of establishing a connection with a user equipment.

12. A method comprising:
causing, in response to a first and a second location request for one user equipment received at a location server within a prescribed time interval, providing to the one user equipment at least one cell having deactivated status in a list of cells provided for location assistance; and
causing activation of the at least one cell by the serving network access node.

13. The method according to claim 12, wherein the list of cells is sent by the location server in a Provide Assistance Data information element to the one user equipment via a serving network access node of the one user equipment.

14. The method according to claim 12, wherein the at least one cell is activated for a probing or beacon mode in which the cell transmits at least a positioning reference signal but is incapable of establishing a connection with a user equipment.

15. A computer program product comprising a non-transitory computer-readable storage medium bearing computer program code embodied therein for use with a computer, the computer program code comprising code for performing at least the following:
causing, in response to a first and a second location request for one user equipment received at a location server within a prescribed time interval, providing to the one user equipment at least one cell having deactivated status in a list of cells provided for location assistance; and
causing activation of the at least one cell by the serving network access node.

16. A method comprising:
changing status of a network access node from active to deactivated;
sending a message to a location server indicating the changed status; and
activating, in response to a serving network access node receiving from the location server a message to activate deactivated cells in a list included in a location request message, the deactivated cells prior to providing the list to a user equipment,
wherein activating the cells comprises activating the cells for a probing or beacon mode in which the cell transmits at least a positioning reference signal but is incapable of establishing a connection with a user equipment.

17. The method according to claim 16, wherein the message is sent only when the status is changed from active to deactivated for energy saving purposes.

18. The method according to claim 16, wherein the network access node operates in an E-UTRAN system and the message sent to the location server is an LPPa protocol message.

19. The method according to claim 18, in which the location server is one of an Enhanced Serving Mobile Location Center (E-SMLC) and a Secure User Plane Location Platform (SLP).

20. A computer program product comprising a non-transitory computer-readable storage medium bearing computer program code embodied therein for use with a computer, the computer program code comprising code for performing at least the following:

changing status of a network access node from active to deactivated;

sending a message to a location server indicating the changed status; and activating, in response to a serving network access node receiving from the location server a message to activate deactivated cells in a list included in a location request message, the deactivated cells prior to providing the list to a user equipment, wherein activating the cells comprises activating the cells for a probing or beacon mode in which the cell transmits at least a positioning reference signal but is incapable of establishing a connection with a user equipment.

\* \* \* \* \*